United States Patent
Nakagawa (10) Patent No.: US 7,384,200 B2
(45) Date of Patent: Jun. 10, 2008

(54) OPTICAL ADAPTOR MOUNTING METAL FITTINGS AND AN OPTICAL ADAPTOR

(75) Inventor: Masaya Nakagawa, Kyoto-shi (JP)

(73) Assignee: Suncall Corporation, Kyoto (JP)

( * ) Notice: Subject to any disclaimer, the term of this patent is extended or adjusted under 35 U.S.C. 154(b) by 0 days.

(21) Appl. No.: 11/643,083

(22) Filed: Dec. 21, 2006

(65) Prior Publication Data
US 2007/0165984 A1   Jul. 19, 2007

(30) Foreign Application Priority Data
Jan. 13, 2006   (JP)   ............... 2006-006072

(51) Int. Cl.
*G02B 6/36* (2006.01)
*G12B 9/00* (2006.01)

(52) U.S. Cl. ............ 385/53; 385/92; 248/27.1; 248/27.3

(58) Field of Classification Search ............ None
See application file for complete search history.

(56) References Cited

U.S. PATENT DOCUMENTS 5,418,875 A * 5/1995 Nakano et al. ............ 385/77
6,325,335 B1 * 12/2001 Harvey ............ 248/27.1
2005/0265666 A1 * 12/2005 Johnson ............ 385/53

FOREIGN PATENT DOCUMENTS

JP       2004045622 A  *  2/2004
JP       3111711           6/2005

* cited by examiner

*Primary Examiner*—Michelle Connelly-Cushwa
*Assistant Examiner*—Omar Rojas
(74) *Attorney, Agent, or Firm*—Jordan and Hamburg LLP (57) ABSTRACT

There is provided an optical adaptor mounting metal fitting for mounting an optical adaptor through a panel without wobbling and an optical adaptor with the mounting metal fitting attached thereto. The optical adaptor mounting metal fitting includes a joining plate and a pair of facing side plates extending from either side of the joining plate nearly at a right angle, the side plates each have an elastic click engagement formed by cutting out and raising a middle part of the side plate so that a front end thereof closely faces the panel. A first side plate piece that is on a joining plate side of the elastic click engagement, and a second side plate piece that is on an opposite side of the elastic click engagement to the first side plate piece, and first elastic engagements each obliquely extend from a front end of the second side plate piece toward the joining plate and the optical adaptor.

9 Claims, 4 Drawing Sheets

OPTICAL ADAPTOR MOUNTING METAL FITTINGS AND AN OPTICAL ADAPTOR

BACKGROUND OF THE INVENTION

The present invention relates to an optical adaptor mounting metal fitting and an optical adaptor, and relates in particular to modifying the structure of an optical adaptor mounting metal fitting for preventing the optical adaptor mounted on a panel through a mounting hole from wobbling.

In the prior art, an optical connector as an optical communication component comprises a pair of SC or MU type plugs each holding an end of an optical fiber and an adaptor having a pair of plug mounting holes in which the pair of plugs can be fitted in a facing manner. Each plug has a ferrule in which the end of an optical fiber is inserted with the end faces of the ferrule and optical fiber being flush with each other.

With a pair of plugs being fitted in an adaptor, the end faces of the pair of ferrules abut each other optically connecting the end faces of the pair of optical fibers. Meanwhile, optical adaptors are mounted, for example, on and through an aluminum mounting panel a having a thickness of 1.6 mm, in a row or several rows. In such a case, a leaf spring mounting metal fitting is attached to the outer surface of the optical adaptor. Various forms of mounting metal fittings have been proposed for easier mounting of the optical adaptor in a mounting hole of the panel.

For example, the optical adaptor mounting metal fitting described in Japanese Utility Model Registration 3111711 is an optical adaptor mounting metal fitting attached to the outer surface of an optical adaptor for preventing the optical adaptor mounted on a panel through a mounting hole thereof from wobbling. This optical adaptor mounting metal fitting comprises a joining plate and a pair of facing side plates extending from either side of the joining plate neatly at a right angle and protruding from the joining plate at both ends in the longitudinal direction.

The side plates each comprise an outer frame and an elastic click engagement formed by cutting out and raising the middle part of the outer frame outward. The outer frame has a curved engagement formed integrally with it at the front end that faces the inner surface of the mounting hole of a panel to elastically engage with a part of the inner surface of the mounting hole.

When an optical adaptor with the optical adaptor mounting metal fitting of Japanese Utility Model Registration 3111711 thereto is mounted on a panel through a mounting hole thereof, the optical adaptor can be secured to the panel without wobbling by means of small elastic deformation of the curved engagement as long as the gaps between the right and left edges of the mounting hole and the right and left sidewalls of the optical adaptor are of the proper size.

However, in this optical adaptor mounting metal fitting, the curved engagement is integrally connected to the outer frame at the top and bottom ends and is smaller in length in the longitudinal direction. Therefore, the curved engagement has a significantly small elastic deformation capacity, yielding insufficient spring elasticity. Furthermore, the outer frame is in the form of a frame, which is difficult to be elastically deformed, yielding almost no spring elasticity.

For this reason, when the panel mounting hole has a small width and the gaps between the right and left inner surfaces of the mounting hole and the right and left sidewalls of the optical adaptor are small, the curved engagement of the mounting metal fitting is not elastically deformed to be flat and is then, not inserted in the mounting hole. Therefore, the optical adaptor cannot be mounted on the panel. When the gaps between the right and left inner surfaces of the mounting hole and the right and left sidewalls of the optical adaptor are large, the curved engagement is not elastically engaged with the inner surface of the mounting hole. Therefore, the optical adaptor is not secured to the panel without wobbling.

SUMMARY OF THE INVENTION

An object of the present invention is to provide an optical adaptor mounting metal fitting that allows an optical adaptor to be mounted in a mounting hole of a panel without wobbling, whether the mounting hole is small or large in width, and an optical adaptor with the optical adaptor mounting metal fitting attached thereto.

The optical adaptor mounting metal fitting according to the invention is an optical adaptor mounting metal fitting made of a thin metal plate that is attached to an outer surface of an optical adaptor for securing to a panel the optical adaptor that is mounted on the panel through a mounting hole thereof, wherein the optical adaptor mounting metal fitting comprises a joining plate and a pair of facing side plates extending from either side of the joining plate nearly at a right angle and protruding from the joining plate at both ends in the longitudinal direction; each of the side plates comprises an elastic click engagement formed by cutting out and raising the middle part of the side plate outward so that a front end thereof closely faces the panel, a first side plate piece that is on the joining plate side of the elastic click engagement and has a free front end, and a second side plate piece that is on the opposite side of the elastic click engagement to the first side plate piece and has a free front end; and first elastic engagements, each obliquely extending toward the joining plate and the optical adaptor from a front end of the second side plate piece, engaging with the mounting hole of the panel are provided.

When the optical adaptor mounting metal fitting is attached to the outer surface of an optical adaptor, the front end of each first elastic engagement abuts a sidewall of the optical adaptor and the second side plate piece is tilted away from the optical adaptor in the front. When the optical adaptor with the mounting metal fitting attached thereto is mounted on a panel through a mounting hole thereof, the elastic click engagements are elastically deformed toward the optical adaptor and returned to an original cut-and-raised position after they pass through the mounting hole. Their front ends closely face an exterior (surface) of the panel so that the optical adaptor never comes off the panel.

When the optical adaptor is mounted in the panel mounting hole together with the mounting metal fitting, the second side plate pieces and first elastic engagements of the side plates are elastically deformed with the second side plate pieces abutting the inner surfaces of the mounting hole and the first elastic engagements abutting sidewalls of the optical adaptor. Therefore, the optical adaptor is mounted and held in the mounting hole without wobbling.

In this optical adaptor mounting metal fitting, the second side plate piece has a free front end. Therefore, the second side plate piece can have large spring elasticity (elastic deformation capacity). Furthermore, the first elastic engagement is extended obliquely from the front end of the second side plate piece toward the joining plate and the optical adaptor and also has a free front end. With this structure, the first elastic engagement can have large spring elasticity (elastic deformation capacity) and the second side plate piece slides along the inner surface of the mounting hole, which allows the optical adaptor and mounting metal fitting to be smoothly mounted in the mounting hole.

Second elastic engagements that are tilted away from the optical adaptor in the front and engaged with the mounting hole of the panel are provided at the front ends of the first side plate pieces.

An optical adaptor is provided to be mounted on and through a panel, wherein a mounting metal fitting is attached to an outer surface of the optical adaptor for securing to the panel the optical adaptor mounted on and through the panel. The mounting metal fitting comprises a joining plate and a pair of facing side plates extending from either side of the joining plate nearly at a right angle and protruding from the joining plate at both ends in the longitudinal direction. Each of the side plates comprises an elastic click engagement formed by cutting out and raising a middle part of the side plate outward so that a front end thereof closely faces the panel, a first side plate piece that is on the joining plate side of the elastic click engagement and has a free front end, and a second side plate piece that is on the opposite side of the elastic click engagement to the first side plate piece and has a free front end. First elastic engagements, each obliquely extending toward the joining plate and the optical adaptor from the front end of the second side plate piece, engaging with the mounting hole of the panel are provided.

The above optical adaptor is provided with a mounting metal fitting that is used for securing an optical adaptor mounted on and through the panel.

The optical adaptor mounting metal fitting comprises a joining plate and a pair of side plates, each side plate having an elastic click engagement and first and second side plate pieces. First elastic engagements are provided with each obliquely extending from the front end of the second side plate piece toward the joining plate and the optical adaptor. When the optical adaptor is mounted on a panel through a mounting hole thereof by means of the mounting metal fitting, the first elastic engagements are elastically deformed according to the magnitude of the gaps between the sidewalls of the optical adaptor and the inner surfaces of the mounting hole. Here, the front ends of the first elastic engagements abut the sidewalls of the optical adaptor and the front ends of the second side plate pieces abut inner surfaces of the mounting hole. Therefore, the optical adaptor can be firmly secured to the panel without wobbling.

Second elastic engagements that are tilted away from the optical adaptor in the front and engaged with the mounting hole of the panel are provided at the front ends of the first side plate pieces. In this way, the second elastic engagements are elastically deformed toward the optical adaptor and elastically engaged with parts of the inner surfaces of the mounting hole. Therefore, the optical adaptor can be firmly secured to the panel without wobbling.

The optical adaptor mounted on and through a panel is provided with a mounting metal fitting that is attached to the outer surface of the optical adaptor for securing the adaptor mounted on the panel to and through the panel.

The optical adaptor mounting metal fitting according to the present invention is an optical adaptor mounting metal fitting made of a thin metal plate for securing an optical adaptor mounted on the panel through a mounting hole thereof, wherein the optical adaptor mounting metal fitting comprises a joining plate and a pair of facing side plates extending from either side of the joining plate nearly at a right angle and protruding from the joining plate at both ends in the longitudinal direction; the side plates each comprise an elastic click engagement formed by cutting out and raising the middle part of the side plate outward so that the front end thereof closely faces the panel, a first side plate piece that is on the joining plate side of the elastic click engagement and has a free front end, and a second side plate piece that is on the opposite side of the elastic click engagement to the first side plate piece and has a free front end; and first elastic engagements, each obliquely extending toward the joining plate and the optical adaptor from the front end of the second side plate piece, engaging with the mounting hole of the panel are provided.

DESCRIPTION OF THE PREFERRED EMBODIMENTS

Figure 1:
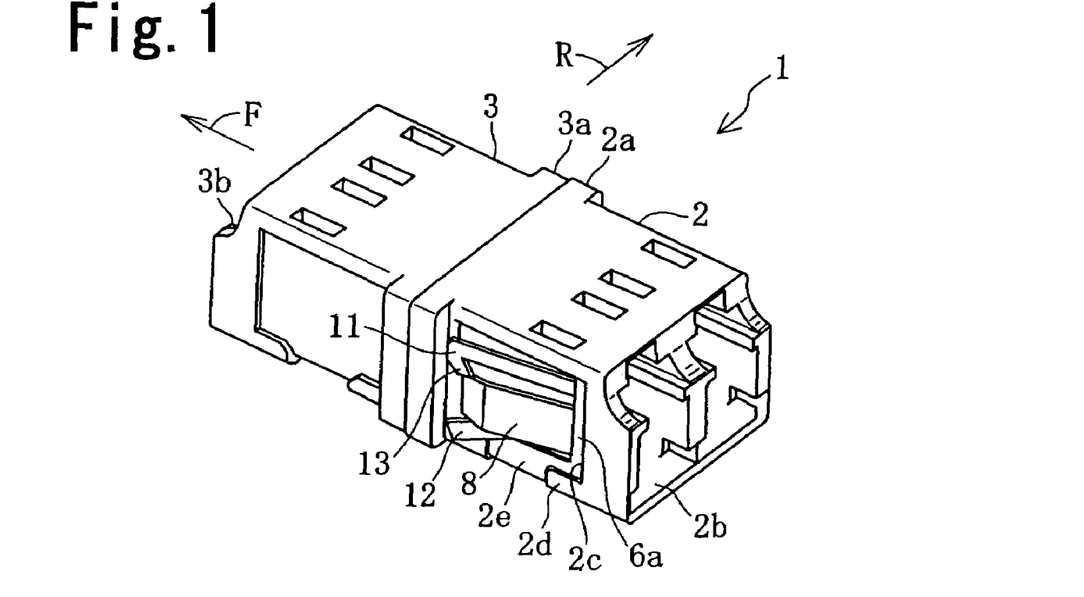
FIG. 1 is a perspective view of an optical adaptor with the mounting metal fitting according to one embodiment of the present invention.

An embodiment of the present invention is described hereafter with reference to the drawings. This is an embodiment in which the present invention is applied to an optical adaptor for an LC type connector. As shown in FIG. 1, an optical adaptor 1 is used for connecting a pair of LC type plugs in which ferrules supporting the ends of optical fibers are incorporated. The optical adaptor 1 is mounted on and secured to and through a mounting panel.

The optical adaptor 1 comprises a pair of synthetic resin housings 2, 3 each having plug mounting holes in which the plugs are inserted and held and an optical adaptor mounting metal fitting 4 attached to the outer surface of one housing 2. The mounting metal fitting 4 is used for securing the optical adaptor 1 mounted on the mounting panel and through a mounting hole thereof to the mounting panel.

The housings 2, 3 have flanges 2a, 3a, respectively, abutting each other at facing ends. The housings 2, 3 have plug mounting holes 2b, 3b, respectively, for mounting plugs. The housings 2, 3 are integrated by bonding abutting surfaces of the respective flanges 2a, 3b.

On the right and left walls of the housing 2 are formed rectangular engaging recessed surfaces 2c for engaging with the side plates 6, 6 of the mounting metal fitting 4, respectively. The rectangular engaging recessed surface 2c is surrounded by an outer peripheral wall 2d that is raised one step and in the form of a rectangular frame. The outer peripheral wall 2d has an engaging notched part 2e at a bottom and nearly at a center in the longitudinal direction, that is continued from the engaging recessed surface 2c for engaging with a corner of a joining plate 5 of the mounting metal fitting 4. The bottom surfaces of the housings 2, 3 have engaging recessed surfaces continued from the engaging notched parts 2e.

Figure 2:
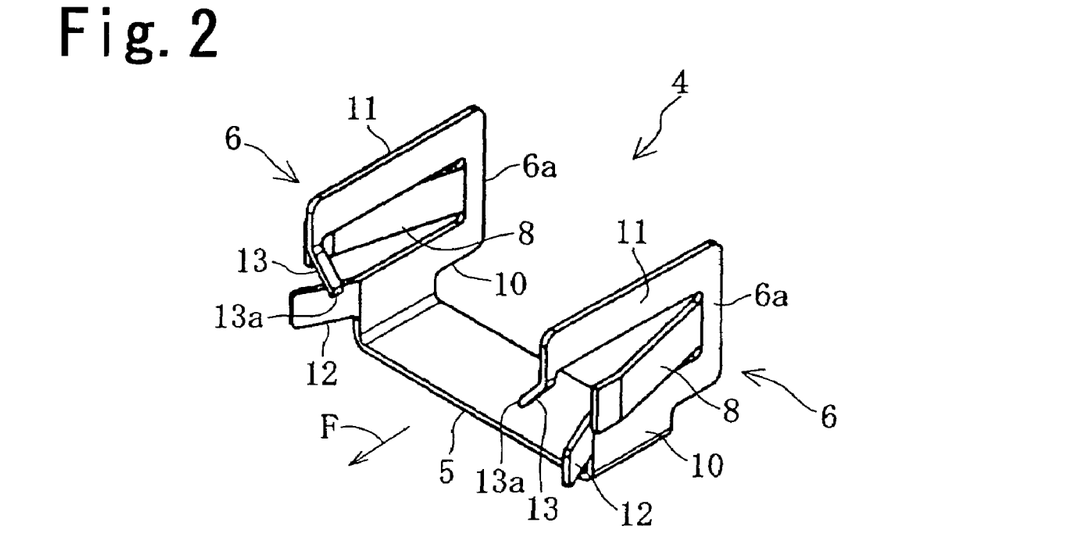
FIG. 2 is a perspective view of the optical adaptor mounting metal fitting.
Figure 3:
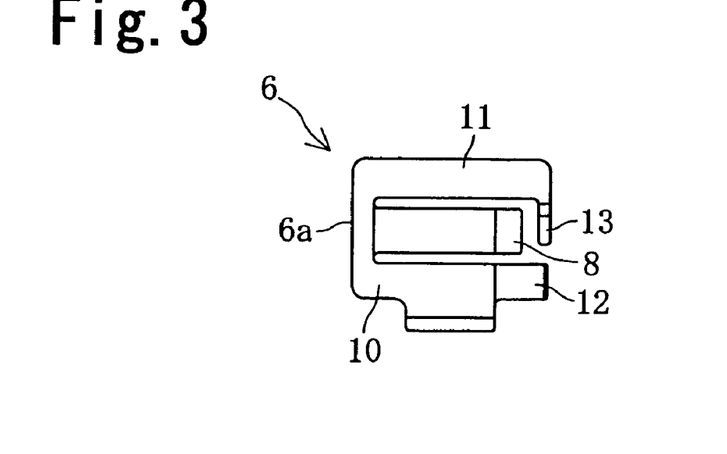
FIG. 3 is a side view of a side plate.
Figure 4:
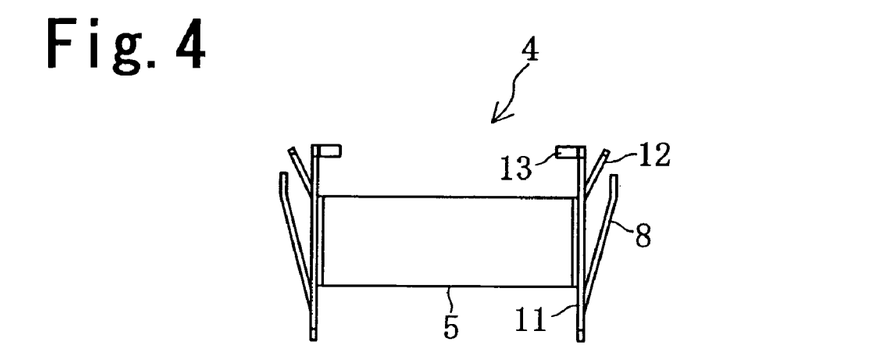
FIG. 4 is a plane view of the mounting metal fitting.
Figure 5:
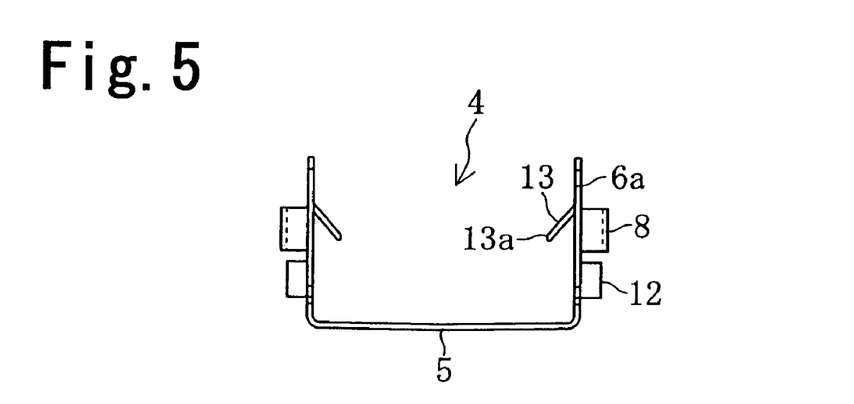
FIG. 5 is a rear view of the mounting metal fitting.

As shown in FIG. 2, the mounting metal fitting 4 is a U-shaped one-piece fitting formed by bending a spring steel plate made of a thin metal plate (for example approximately 0.3 mm in thickness) having elastic properties and which is bilaterally symmetric.

The mounting metal fitting 4 comprises a joining plate 5 in the form of a transversally elongated band and a pair of facing side plates 6, 6 extending from either side of the joining plate 5 nearly at a right angle and protruding from the joining plate 5 at both ends in the longitudinal direction.

As shown in FIGS. 1 to 6, 9, and 10, the side plate 6 has a rectangular shape and comprises an elastic click engagement 8 in the middle part, a first side plate piece 10 on the joining plate 5 side of the elastic click engagement 8, a second side plate piece 11 on the opposite side of the elastic click engagement 8 to the first side plate piece 10, and a rear end piece 6a at the rear end.

The elastic click engagement 8 is formed by a part of the side plate 6 that is cut out and raised outward. A rear end of the elastic click engagement 8 is a fixed end continued to the rear end piece 6a. The elastic click engagement 8 is tilted so that it protrudes more transversely outward in the front than in the back. A front end of the elastic click engagement 8 is a free end, which is partly made parallel to the side plate 6. When the optical adaptor 1 is mounted on a mounting panel 18, the front edge of the free end of the elastic click engagement 8 closely faces the exterior surface of the mounting panel 18 so as to prevent the optical adaptor 1 from wobbling in the longitudinal direction.

As shown in FIGS. 2 to 7, the first side plate piece 10 has a nearly rectangular shape elongated in the longitudinal direction. The rear end of the first side plate piece 10 is a fixed end continued to the rear end piece 6a while the front end thereof is a free end. A rectangular second elastic engagement 12 is provided at the free front end of the first side plate piece 10. The second elastic engagement 12 is tilted away from the optical adaptor in the front, protrudes outward from the first side plate piece 10 and is elastically engaged with part of an inner surface of the mounting hole 18a of the mounting panel 18.

Figure 6:
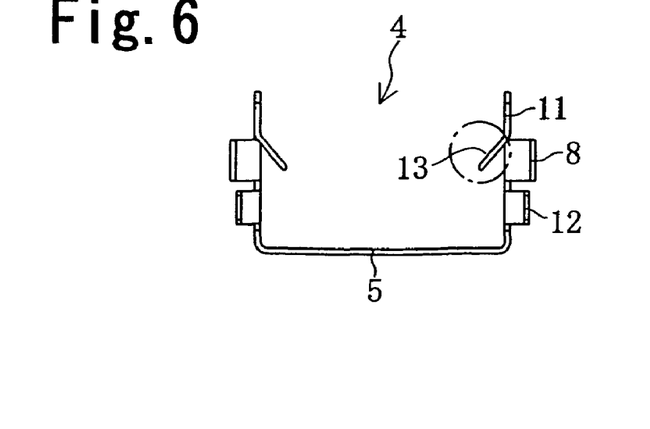
FIG. 6 is a front view of the mounting metal fitting.
Figure 7:
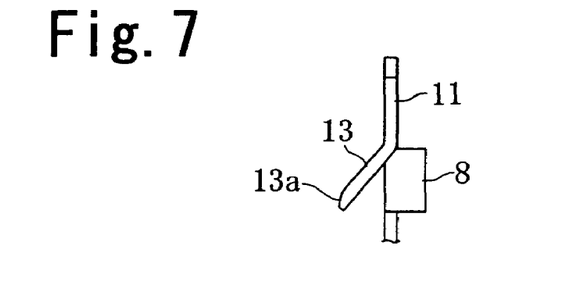
FIG. 7 is a partial enlarged front view of the core part including the first elastic engagement.

As shown in FIGS. 2 to 7, the second side plate piece 11 has a nearly rectangular shape elongated in the longitudinal direction. The rear end of the second side plate piece 11 is a fixed end continued to the rear end piece 6a while the front end is a free end. A first elastic engagement 13 that has a small width, is engaged with the mounting hole 18a of the mounting panel 18, and is integrally formed at the free front end of the second side plate piece 11. As shown in FIG. 7, the first elastic engagement 13 is extended obliquely downward from a bottom of the front end of the second side plate piece 11 toward the joining plate 5 and the optical adaptor 1. The first elastic engagement 13 has an abutting surface 13a at the front end so that the front end of the first elastic engagement 13 makes area contact with a sidewall of the adaptor 1 when the mounting metal fitting 4 is attached to an outer surface of the optical adaptor 1.

As shown in FIGS. 6 and 7, the first elastic engagement 13 has a length equal to the vertical length of the second side plate piece 11. The first elastic engagement 13 makes an angle of approximately 35 to 45 degrees relative to the vertical plane containing the second side plate piece 11.

The mounting panel 18 on which the optical adaptor 1 is mounted is briefly described hereafter.

Figure 8:
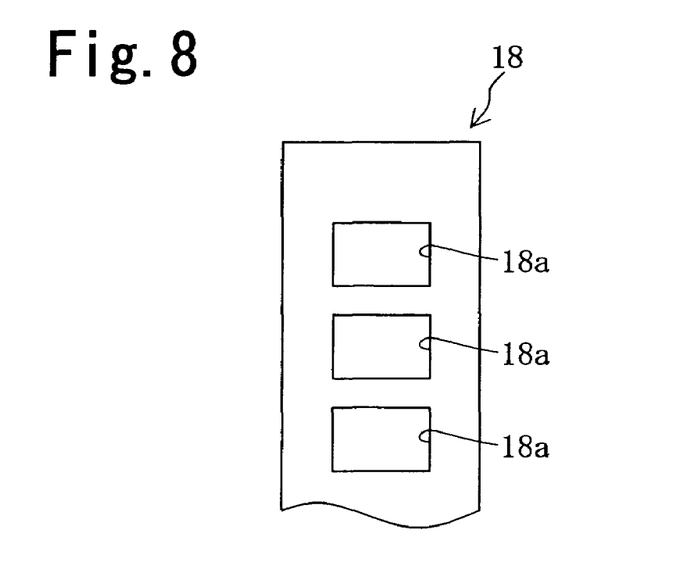
FIG. 8 is a partial plane view of a mounting panel.

As shown in FIG. 8, the mounting panel 18 is made of an aluminum plate having a thickness of approximately 1.6 mm and anti-corrosive coatings. Multiple rectangular mounting holes 18a in which the optical adaptors 1 are mounted are formed in the mounting panel 18. Each mounting hole 18a is 9.5 mm in length (in the vertical direction in the figure) and 13.1 mm in width (in the horizontal direction in the figure).

Functions and advantages of the mounting metal fitting 4 and the optical adaptor 1 with the mounting metal fitting 4 attached thereto are described hereafter. The mounting metal fitting 4 is attached to the outer surface of the optical adaptor 1 as shown in FIG. 1 before the optical adaptor 1 is mounted on the mounting panel 18. Here, the mounting metal fitting 4 is held with the joining plate 5 being at the bottom and the pair of side plates 6, 6 corresponding to the engaging recessed surfaces 2c, respectively, as shown in FIG. 2 and then, the pair of side plates 6, 6 are fitted in the corresponding engagement recessed surfaces 2c, respectively, as shown in FIG. 1.

Figure 9:
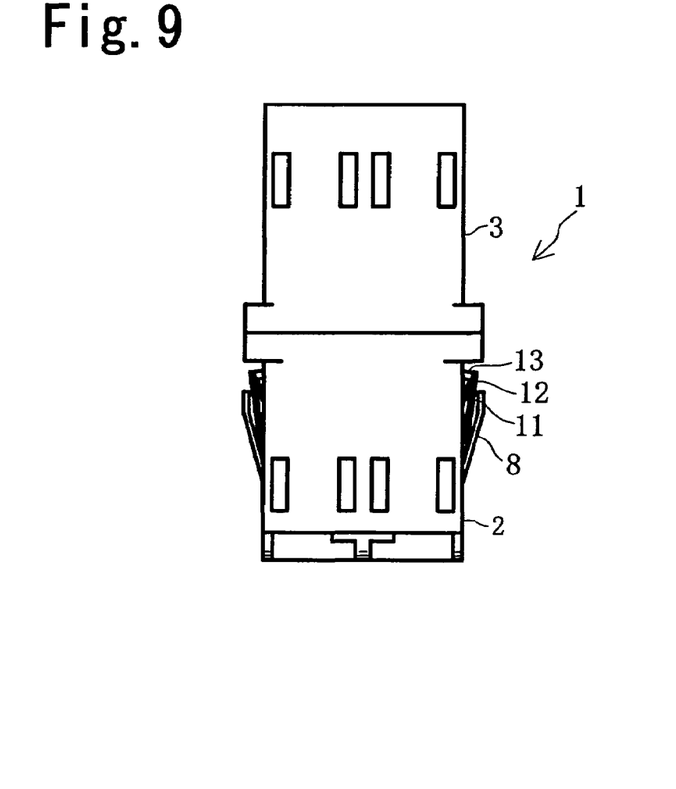
FIG. 9 is a plane view of the optical adaptor with the mounting metal fitting attached thereto.

After the mounting metal fitting 4 is attached to outer surface of the optical adaptor 1 with the right and left corners of the joining plate 5 being engaged with the engaging notched parts 2e, the abutting surfaces 13a, 13a provided at the front ends of the pair of first elastic parts 13, 13 each abut the sidewalls of the optical adaptor 1 and the second side plate pieces 11, 11 are elastically deformed outward so that they are away from the optical adaptor 1 in the front as shown in FIG. 9. In this attached state, the mounting metal fitting 4 is not allowed to shift relative to the optical adaptor 1 in the vertical, transversal, and longitudinal directions. Therefore, the mounting metal fitting 4 can be integrally attached to the optical adaptor 1.

Figure 10:
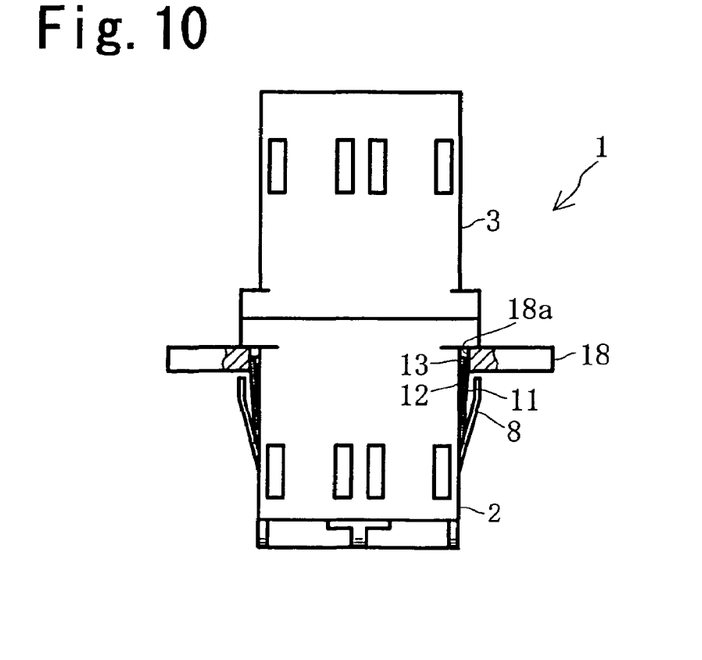
FIG. 10 is a plane view of an optical adaptor with the mounting metal fitting attached thereto in mounted condition on a mounting panel.

Then, when the optical adaptor 1 is mounted on the mounting panel 18 through the mounting hole 18a, the state of the optical adaptor 1 is changed from that shown in FIG. 9 to that shown in FIG. 10. Here, the pair, right and left, of elastic click engagements 8, 8 are elastically deformed inward while they pass through the mounting hole 18a. Then, the pair of elastic click engagements 8, 8 each are returned to the cut-and-raised position because of elasticity (see FIG. 10).

In this way, the front ends of the elastic click engagements 8, 8 abut or closely face the exterior surface of the mounting hole 18a of the mounting panel 18 so that the optical adaptor 1 cannot be withdrawn from or come off the mounting hole 18a of the mounting panel 18, preventing the optical adaptor 1 from wobbling in the longitudinal direction. The elastic click engagements 8, 8 can be easily made larger in length than those shown in FIG. 10. However, the thickness of the panel 18 varies. Therefore, the length of the elastic click engagements 8, 8 is determined so that the optical adaptor 1 can be mounted in the mounting hole 18a of the mounting panel 18 having the largest thickness.

When the optical adaptor 1 is mounted in the mounting hole 18a of the mounting panel 18 by means of the mounting metal fitting 4, the front ends of the respective elastic engagements 13, 13 abut the sidewalls of the optical adaptor 1 and the second side plate pieces 11, 11 abut and are engaged with the inner surfaces of the mounting hole 18a. The first elastic engagements 13, 13 are elastically deformed along the sidewalls of the adaptor 1 into an elastically deformed state in which they have a smaller degree of curvature. Because of sufficient elastic engagement provided by the first elastic engagements 13, 13, the adaptor 1 is held in the mounting hole 18a without wobbling.

Furthermore, the second elastic engagements 12, 12 provided at the front ends of the first side plate pieces 10, 10 elastically engage with the inner surfaces of the mounting hole 18a. The pair of second elastic engagements 12, 12 also contributes to eliminating wobbling to a certain extent.

As described above, when the optical adaptor 1 with the mounting metal fitting 4 attached thereto is mounted on the mounting panel 18 through the mounting hole 18a, the first elastic engagements 13, 13 are elastically deformed for a decreased degree of curvature according to the magnitude of the gap between the right and left sidewalls of the optical adaptor 1 and the inner surfaces of the mounting hole 18 and the front ends of the second side plate pieces 11, 11 are closely pressed against and in contact with the inner surfaces of the mounting hole 18a of the panel 18 for engagement. Therefore, the gaps between the inner surfaces of the mounting hole 18a and the optical adaptor 1 are eliminated and, then, the optical adaptor 1 does not wobble in the transversal direction. Whether the gaps between the right and left sidewalls of the optical adaptor 1 and the inner surfaces of the mounting hole 18a are large or small, the first elastic engagements 13, 13 are elastically deformed according to the magnitude of the gaps to eliminate wobbling.

Particularly, the second side plate piece 11 has a free front end. Therefore, the second side plate piece 11 has a large elastic deformation capacity. Furthermore, the first elastic engagement 13 has a free bottom end. Therefore, the first elastic engagement 13 has a large elastic deformation capacity. In this way, whether the gaps between the right and left sidewalls of the optical adaptor 1 and the inner surfaces of the mounting hole 18a are large or small, wobbling is eliminated.

The optical adaptor 1 with the above mounting metal fitting 4 attached thereto has the same functions and advantages as the above mounting metal fitting 4 and, in addition, can be highly reliably used.

The above optical adaptor mounting metal fitting 4 is produced by forming the joining plate 5 and pair of side plates 6, 6 as one piece and further forming on each side plate 6 the elastic click engagement 8, first side plate piece 10, and second side plate piece 11 as one piece. This can easily be produced by cutting out and pressing a single metal plate, which is advantageous in terms of production cost.

Modified embodiments in which the above embodiment is partially modified are described hereafter.

1) In the above mounting metal fitting 4, the second elastic engagements 12, 12 are provided at the front ends of the pair of first side plate pieces 10, 10. However, the mounting metal fitting can be constituted without the second elastic engagements 12, 12.

2) The mounting metal fitting 4 and optical adaptor 1 are not restricted to the structures described above and various modifications can be made thereto. The present invention is not restricted to the optical adaptor 1 for connecting SC type plugs and, needless to say, can be applied to those for connecting MU or LC type plugs.

I claim:

1. An optical adaptor mounting metal fitting made of a thin metal plate for attachment to an optical adaptor for securing the optical adaptor in a mounting hole of a panel, wherein said panel extends in a plane extending in first and second directions orthogonal to each other, and a third direction is orthogonal to said first and second direction, said optical adaptor mounting metal fitting comprising:

a joining plate having laterally extending front and back edges, said front edge being arranged to face toward said panel in an installed position, said joining plate having first and second side edges on opposing sides of said joining plate; and first and second side plates respectively extending from said first and second side edges of said joining plate substantially at a right angles, each of said first and second side plates having inside faces facing one another and outside faces:

a first side portion extending from a respective one of said first and second side edges of said connecting plate, said first side portion having a first side portion front end and a first side portion back end;

a second side portion extending along said third direction substantially parallel to and spaced apart from said first side portion, said second side portion having a second side portion front end and a second side portion back end;

a rear side portion connecting said second side portion to said first side portion;

said first side portion, said second side portion and said rear side portion defining a side opening, said rear side portion having a rear side portion front edge defining a rear boundary of said side opening;

said first side portion, said second side portion, and said rear side portion being disposed substantially in a common plane of the respective one of said first and second side plates after formation of said optical adaptor mounting metal fitting from said thin metal plate and prior to installation on said optical adaptor, said common plane extending in said second and third directions;

an elastic pawl member extending from said rear side portion front edge and outward from said side opening at a pawl inclination angle relative to said common plane of the respective one of said first and second side plates, said elastic pawl having a rear end connected to said rear side portion front edge and a front end edge disposed to oppose a rear surface of said panel adjacent the mounting hole;

a first elastic engagement member having a first end connected to said second side portion front end, said first elastic engagement member extending longitudinally from said second side portion front end and toward a plane of said joining plate, said first elastic engagement member being disposed at an inclined angle relative said common plane of the respective one of said first and second side plates to extend inwardly toward an opposing one of said first and second side plates such that, when the optical adaptor mounting metal fitting is attached to the optical adaptor, the first elastic engagement member contacts a side of the optical adaptor to elastically displace said second side portion away from the optical adaptor and into engagement with an interior edge of the mounting hole when the optical adaptor is installed in the panel; and a second elastic engagement member having a first end connected to said first side portion front end, said second elastic engagement member extending longitudinally forward from said first side portion front end, said second elastic engagement member being disposed at an inclined angle relative said common plane of the respective one of said first and second side plates to extend outwardly from a respective one of said first and second side plates and away from the optical adaptor when the optical adaptor mounting metal fitting is attached to the optical adaptor and to engage the interior edge of the mounting hole when the optical adaptor is installed in the panel.

2. The optical adaptor mounting metal fitting according to claim 1 wherein said first elastic engagement member has a second end which is on an end opposing said first end of said first elastic engagement member and which has a chamfered edge which engages the optical adaptor when the optical adaptor mounting metal fitting is attached to the optical adaptor.

3. The optical adaptor mounting metal fitting according to claim 1 wherein said first elastic engagement member and said second elastic engagement member extend further forward in said third direction than said elastic pawl member.

4. An optical adaptor comprising:
an optical adaptor body and an optical adaptor mounting metal fitting made of thin metal plate and installed to the optical adaptor body, the optical adaptor mounting metal fitting being configured for attaching to the optical adaptor and securing the optical adaptor in a mounting hole of a panel, wherein said panel extends in a plane extending in first and second directions orthogonal to each other, and a third direction is orthogonal to said first and second direction;
said optical adaptor body having opposing first and second body sides, opposing third and fourth body sides, a front side body portion which extends beyond a front surface of the panel, and a back side body portion which extends beyond a rear surface of the panel; and
said optical adaptor mounting metal fitting comprising:
a joining plate having laterally extending front and back edges, said front edge being arranged to face toward said panel in an installed position, said joining plate having first and second side edges on opposing sides of said joining plate, said joining plate being disposed along said fourth body side; and
first and second side plates respectively extending from said first and second side edges of said joining plate substantially at a right angles, said first and second side plates having inside faces respectively facing said first and second body sides, said first and second side plates each having:
a first side portion extending from a respective one of said first and second side edges of said connecting plate, said first side portion having a first side portion front end and a first side portion back end;
a second side portion extending along said third direction substantially parallel to and spaced apart from said first side portion, said second side portion having a second side portion front end and a second side portion back end;
a rear side portion connecting said second side portion to said first side portion;
said first side portion, said second side portion and said rear side portion defining a side opening, said rear side portion having a rear side portion front edge defining a rear boundary of said side opening;
said first side portion, said second side portion, and said rear side portion being disposed substantially in a common plane of the respective one of said first and second side plates after formation of said optical adaptor mounting metal fitting from said thin metal plate and prior to installation to said optical adaptor body, said common plane extending in said second and third directions;
an elastic pawl member extending from said rear side portion front edge and outward from said side opening at a pawl inclination angle relative to a respective one of said first and second body sides, said elastic pawl having a rear end connected to said rear side portion front edge and a front end edge disposed to oppose a rear surface of said panel adjacent the mounting hole;
a first elastic engagement member having a first end connected to said second side portion front end, said first elastic engagement member extending longitudinally toward a plane of said joining plate, said first elastic engagement member being disposed at an inclined angle relative said common plane of the respective one of said first and second side plates to extend inwardly toward a respective one of said first and second body sides such that, when the optical adaptor mounting metal fitting is attached to the optical adaptor body, the first elastic engagement member contacts the respective one of said first and second body sides to elastically displace said second side portion away from the optical adaptor body and into engagement with an interior edge of the mounting hole when the optical adaptor is installed in the panel; and
a second elastic engagement member having a first end connected to said first side portion front end, said second elastic engagement member extending longitudinally forward from said first side portion front end, said second elastic engagement member being disposed at an inclined angle relative to a respective one of said first and second adaptor body sides to extend outwardly from the respective one of said first and second body sides and to engage the interior edge of the mounting hole when the optical adaptor is installed in the panel.

5. The optical adaptor according to claim 4 wherein said first elastic engagement member has a second end which is on an end opposing said first end of said first elastic engagement member and which has a chamfered edge which engages the optical adaptor body.

6. The optical adaptor according to claim 4 wherein said first elastic engagement member and said second elastic engagement member extend further forward in said third direction than said elastic pawl member.

7. A panel mounted optical adaptor arrangement, comprising:
a panel having a mounting hole formed therein;
an optical adaptor body and an optical adaptor mounting metal fitting made of thin metal plate and installed to the optical adaptor body, the optical adaptor mounting metal fitting being attached to the optical adaptor and securing the optical adaptor in the mounting hole of the panel, wherein said panel extends in a plane extending in first and second directions orthogonal to each other, and a third direction is orthogonal to said first and second direction;
said optical adaptor body having opposing first and second body sides, opposing third and fourth body sides, a front side body portion which extends beyond a front surface of the panel, and a back side body portion which extends beyond a rear surface of the panel; and
said optical adaptor mounting metal fitting comprising:
a joining plate having laterally extending front and back edges, said front edge being arranged to face toward said panel in an installed position, said joining plate having first and second side edges on opposing sides of said joining plate, said joining plate being disposed along said fourth body side; and
first and second side plates respectively extending from said first and second side edges of said joining plate substantially at a right angles, said first and second side plates having inside faces respectively facing said first and second body sides, said first and second side plates each having:
- a first side portion extending from a respective one of said first and second side edges of said connecting plate, said first side portion having a first side portion front end and a first side portion back end;
- a second side portion extending along said third direction substantially parallel to and spaced apart from said first side portion, said second side portion having a second side portion front end and a second side portion back end;
- a rear side portion connecting said second side portion to said first side portion;
- said first side portion, said second side portion and said rear side portion defining a side opening, said rear side portion having a rear side portion front edge defining a rear boundary of said side opening;
- said first side portion, said second side portion, and said rear side portion being disposed substantially in a common plane of the respective one of said first and second side plates after formation of said optical adaptor mounting metal fitting from said thin metal plate and prior to installation to said optical adaptor body, said common plane extending in said second and third directions;
- an elastic pawl member extending from said rear side portion front edge and outward from said side opening at a pawl inclination angle relative to a respective one of said first and second body sides, said elastic pawl having a rear end connected to said rear side portion front edge and a front end edge disposed opposing a rear surface of said panel adjacent the mounting hole;
- a first elastic engagement member having a first end connected to said second side portion front end, said first elastic engagement member extending longitudinally toward a plane of said joining plate, said first elastic engagement member being disposed at an inclined angle relative said common plane of the respective one of said first and second side plates to extend inwardly toward a respective one of said first and second body sides such that, when the optical adaptor mounting metal fitting is attached to the optical adaptor body, the first elastic engagement member contacts the respective one of said first and second body sides to elastically displace said second side portion away from the optical adaptor body and into engagement with an interior edge of the mounting hole so as to secure the optical adaptor in the panel; and
- a second elastic engagement member having a first end connected to said first side portion front end, said second elastic engagement member extending longitudinally forward from said first side portion front end, said second elastic engagement member being disposed at an inclined angle relative to a respective one of said first and second adaptor body sides to extend outwardly from the respective one of said first and second body sides and to engage the interior edge of the mounting hole to secure the optical adaptor in the panel.

8. The panel mounted optical adaptor arrangement, according to claim 7 wherein said first elastic engagement member has a second end which is on an end opposing said first end of said first elastic engagement member and which has a chamfered edge which engages the optical adaptor body.

9. The panel mounted optical adaptor arrangement according to claim 7, wherein said first elastic engagement member and said second elastic engagement member extend further forward in said third direction than said elastic pawl member.

* * * * *